Sept. 24, 1940.  W. T. MAHLA  2,215,930
PIPE OR TUBE
Filed May 17, 1939
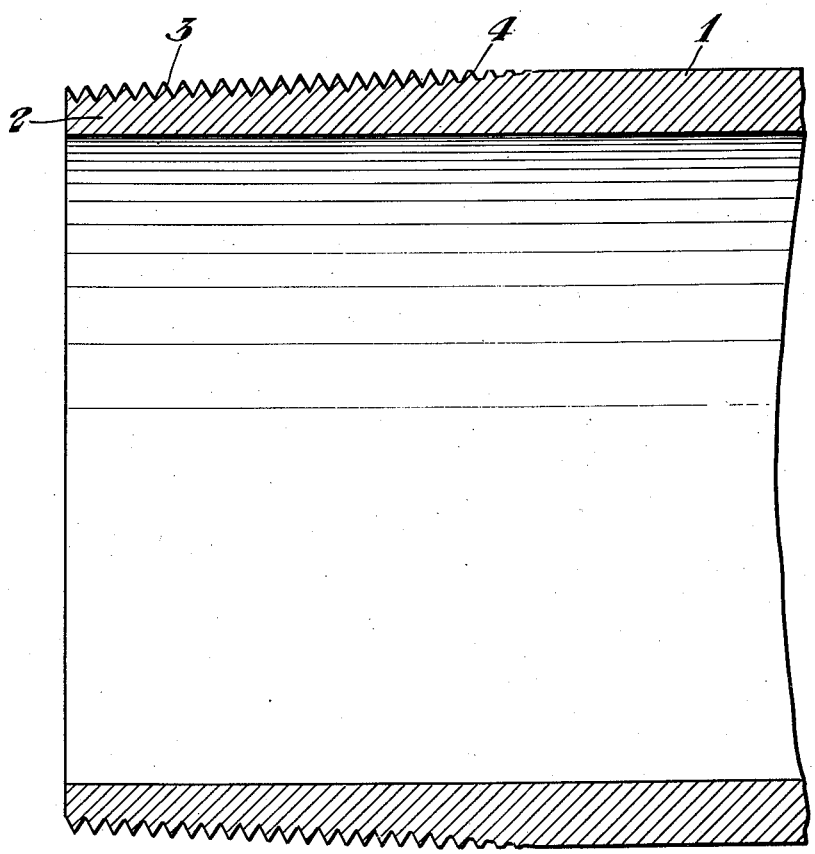
Inventor:
WALTER T. MAHLA,
by: John E. Jackson
his Attorney.

Patented Sept. 24, 1940

2,215,930

UNITED STATES PATENT OFFICE 2,215,930

PIPE OR TUBE

Walter T. Mahla, Lorain, Ohio, assignor to National Tube Company, a corporation of New Jersey Application May 17, 1939, Serial No. 274,277

2 Claims. (Cl. 285—146)

This invention relates to pipes or tubes having threaded ends provided for threaded jointing thereof.

A specific example is illustrated by the accompanying drawing which shows the tapered, threaded end of a pipe, which is intended for threaded engagement with another pipe.

More specifically, this drawing shows a steel pipe 1 having a tapered end portion 2 provided with threads 3 that gradually vanish into the pipe as indicated at 4.

According to the invention, the threads 3 which are cut in the tapered end portion 2 are hardened at least adjacent the extreme end of the pipe or tube, the threads that gradually vanish being softer than these hardened threads and preferably not hardened at all whereby they have the same hardness as the metal body of the pipe 1. Preferably, the perfect or fully formed threads are hardened equally while the vanishing threads are unhardened, the harder metal of the hardened threads gradually merging with the softer metal of the softer, vanishing threads. The mode of hardening the threads may vary, case-hardening or other methods being suitable.

The idea herein disclosed is particularly applicable to pipes or tubes that work mechanically when in service, such as, for instance, oil well drill pipes. Such pipes have such a chemical analysis that it is possible to flame-harden the threads. Only the threads should be hardened, the remainder of the metal of the pipe to have its normal hardness which will be, in all events, softer than the hardened threads.

A product such as herein disclosed is of particular value when it must work under tension, the hardened threads function to stiffen the jointed parts so as to prevent collapse or spreading of the same and consequent unjointing when the assembly is heavily tensioned. Another advantage is that it prevents stripping of the threads while at the same time permitting proper jointing without the observance of unusually close manufacturing tolerances, the softer vanishing threads being capable of some slight distortion when stressed by screwing action of the hardened complete threads.

I claim:

1. A metal pipe or tube made of the same metal throughout and having threads formed in its end portion to provide for threaded jointing thereof, said metal being hardenable and its portions forming the threads adjacent the extreme end of said pipe or tube being hardened to a greater hardness than the remaining portions of said metal including those portions thereof forming succeeding threads relatively more remote from said extreme end, said hardened portions of said metal stiffening said end portion against collapse or spreading and tending to prevent stripping of said threads while said portions of said metal forming said succeeding threads permitting distortion of the latter when stressed by screwing action of the threads made of said hardened portions, whereby it is unnecessary to observe unusually close manufacturing tolerances in the forming of said threads.

2. A metal pipe or tube made of the same metal throughout with a tapered end portion and having threads formed in said end portion for threaded jointing thereof including complete threads adjacent the end of said pipe or tube and succeeding threads relatively more remote from said extreme end that gradually vanish, said metal being hardenable and only portions thereof forming said complete threads being hardened to a greater hardness than the remaining portions including those portions thereof forming said succeeding threads, said hardened portions of said metal stiffening said end portion against collapse or spreading and tending to prevent stripping of said threads while said portions of said metal forming said succeeding threads permit distortion of the latter when stressed by screwing action of the threads made of said hardened portions, whereby it is unnecessary to observe unusually close manufacturing tolerances in the forming of said threads.

WALTER T. MAHLA.